Figures 1, 2:
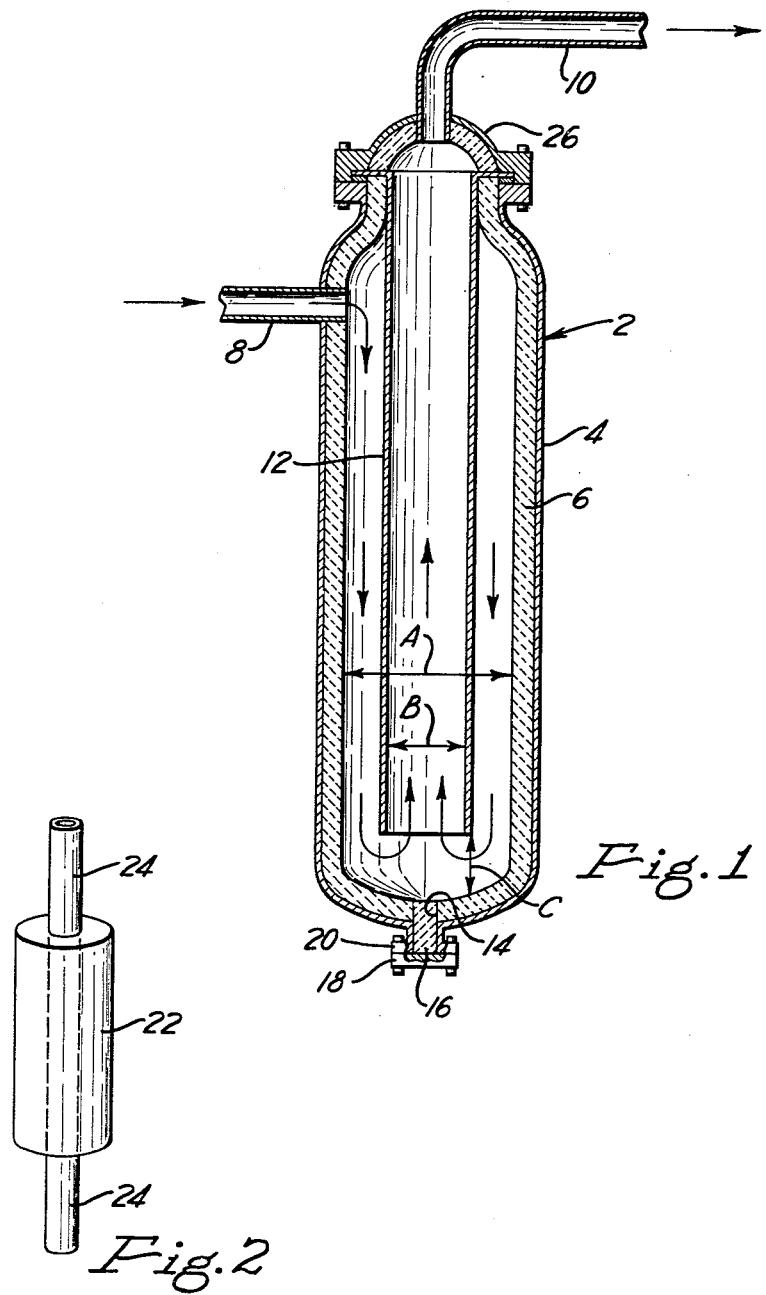

Sept. 15, 1964  E. M. GLAZIER ETAL  3,149,176
HYDRODEALKYLATION PROCESS
Filed July 13, 1961

INVENTORS
EDWIN M. GLAZIER
RALPH W. HELWIG
VERNON J. YEAKLEY
BY

ATTORNEY

United States Patent Office 3,149,176
Patented Sept. 15, 1964

3,149,176
HYDRODEALKYLATION PROCESS
Edwin M. Glazier, Fox Chapel Boro, and Ralph W. Helwig and Vernon J. Yeakley, Oakmont, Pa., assignors to Gulf Research & Development Company, Pittsburgh, Pa., a corporation of Delaware
Filed July 13, 1961, Ser. No. 123,728
1 Claim. (Cl. 260—672)

This invention relates to a process and apparatus for the hydrodealkylation of alkyl aromatics, particularly to the thermal hydrodealkylation of alkyl aromatics.

Alkyl aromatics, such as toluene, can be dealkylated to lighter aromatics, such as benzene, by subjecting such alkyl aromatic in the presence of hydrogen to an elevated temperature and an elevated pressure for a controlled length of time. As a result of such reaction conditions the alkyl group is cleaved from the alkyl aromatic and combines with the hydrogen present to form a saturated aliphatic hydrocarbon. The desired aromatic can be separated from the saturated aliphatic hydrocarbon and unreacted alkyl aromatic, if present, in any convenient manner.

The hydrodealkylation reaction is highly exothermic. In addition as the temperature of the reaction is increased the amount of time required for a given amount of reaction is greatly decreased, or for the same residence time conversion and yield of alkyl aromatic to desired product is greatly increased. It would be extremely desirable, therefore, to employ some of the heat of reaction to obtain extremely high temperature levels in the reaction zone. This desirable condition has been difficult to achieve in the past, however, since common, inexpensive metals which could be used in the design of the desired reactor would be unlikely to withstand the pressures imposed on the same under the high temperature conditions employed. Moreover, with hydrogen present severe danger to metals due to hydrogen embrittlement and blistering at high temperatures would also be likely to occur.

We have found that the above difficulties can be avoided and the hydrodealkylation of alkyl aromatics can be effected at extremely high temperatures, using the heat of reaction as an aid in arriving at the high reaction temperature, without unduly weakening the metal walls of the reactor by following the procedures outlined herein.

The advantages of the present invention can be understood by reference to the accompanying drawing which forms a part of this specification. FIGURE 1 is a cross-sectional view of a reactor which can be employed in the practice of the present invention. FIGURE 2 illustrates a refractory plug provided with means for introducing quench into the reactor.

Referring to FIGURE 1 there is illustrated an elongated reactor vessel 2 provided with an outer metal shell 4 and an inner refractory liner 6. Reactor vessel 2 is provided on one side and adjacent one end thereof with an inlet line 8 for introducing reactants therein. An outlet line 10 is provided at one end of reactor vessel 2 adjacent inlet line 8. In order to obtain the desired movement of reactants and reaction products through reactor vessel 2 a tube or baffle 12 is employed. One end of tube 12 is suitably and sealingly mounted to reactor vessel 2 at one end thereof adjacent outlet line 10, and concentrically positioned therein, while the other end of tube 12 terminates short of the other end of reactor vessel 2. In this way the reactants as they enter reactor vessel 2 are not short circuited to line 10 but flow downwardly in a longitudinal annular path between the refractory liner 6 and the outer wall of tube 12 and thereafter upwardly within the core of said longitudinal path created by tube 12 to outlet line 10. Since in most cases the cross-sectional area of the longitudinal annular path is about equal or less than the cross-sectional area of said core, the cross-sectional area through which the reactants, and reaction products present at the moment, must traverse in their movement from the longitudinal annular path to said core must also be about equal to the smaller of said cross-sectional areas. If the cross-sectional area were significantly less, an undue pressure drop would be present at the point wherein such movement reverses itself; if the cross-sectional area were more a stagnant area would be formed. Therefore the distance C, which is approximately the distance between the free end of tube 12 and the adjacent end of the refractory line 6, can be derived as follows:

$$\pi BC = \frac{\pi}{4} A^2 - \frac{\pi}{4} B^2 = \frac{\pi}{4}(A^2 - B^2)$$

$$C = \frac{\pi(A^2 - B^2)}{4\pi B} = \frac{A^2 - B^2}{4B}$$

wherein A is the internal diameter of reactor 2 and B is the internal diameter of baffle 12. In order to remove solid or particulate material which may form or be deposited within reactor vessel 2, there can be provided at the end thereof remote from outlet line 10 an opening 14, preferably circular in cross-section, wherein there fits a refractory plug 16, preferably of the same composition as refractory liner 6, which can be held in place by blind flange 18 bolted or otherwise attached to flange 20 which forms a part of the metal shell 4. In the event the reaction occurring herein is quenched, refractory plug 16 can be removed and replaced with a similar refractory plug 22 provided with a metal inlet line 24 for said quench. Access into reactor vessel 2 can be had by providing the same with a removable cap 26 which can be bolted or otherwise securely attached thereto.

The reactor herein described is suitable for use in the thermal hydrodealkylation of alkyl aromatics such as toluene, xylene, trimethyl benzene isomers, alkyl naphthalenes and mixtures thereof. The initial step involves heating the alkyl aromatic and hydrogen to hydrodealkylation temperature. In general preheat temperature can range from about 1000° to about 1100° F. Sufficient hydrogen must be present to replace the alkyl chain cleaved from the aromatic ring at the elevated reaction temperatures and also to combine with the alkyl chain to form therewith a saturated aliphatic hydrocarbon. In general the molar ratio of hydrogen to alkyl aromatic charge can be from about one to about 10. The heated reaction mixture is introduced into the reactor vessel 2 by line 8 and starts its longitudinal annular movement. The desired dealkylation reaction becomes autogenous at the temperature of about 1000° to about 1100° F. The dealkylation reaction is highly exothermic. At the high temperatures involved herein the allowable metal stress is comparatively low and it would be extremely expensive to use a suitable metal which would withstand the pressures employed, which can be above 100 pounds per square inch gauge, preferably about 100 to about 1000 pounds per square inch gauge. In addition, common, inexpensive metals in the presence of hydrogen at the temperatures and pressures employed suffer considerably from hydrogen embrittlement and blistering. For such reason a refractory lining 6 is employed as an insulating medium in order to maintain the temperature of metal wall 4 at a level no greater than about 500° to about 1000° F.

As the reaction mixture proceeds downwardly in its annular path and the dealkylation reaction progresses and the heat resulting from the reaction is in large measure retained in the reaction zone by refractory lining 6, the temperature of the reaction mixture continues to rise.

As the temperature of the reaction mixture rises the rate of reaction also rises. By the time the path of movement of the reaction mixture reverses itself, rises in the core created within tube 12 and is removed from the reactor the temperature of the reaction mixture has risen to a level of about 1300° to 1700° F. This is advantageous in that, as noted, the higher the temperature level, the higher the rate of reaction. In addition, with the highest temperature obtained herein being located within the core created by tube 12, it becomes easier to protect the refractory liner 6, and particularly the metal wall 4, from the heat present therein. The reaction mixture in the longitudinal annular path, being at a lower temperature than the material in the core, is preheated thereby and serves as an additional insulating medium for refractory liner 6 and metal wall 4. Tube 12 is under practically no pressure burden other than that resulting from its own weight.

Stabilized high alloy austenitic steel such as the following:

| Nominal Composition | ASME Serial Designation | Grade |
| --- | --- | --- |
| 16Cr-13Ni-3Mo | SA-213 | TP-316. |
| 16Cr-13Ni-3Mo | SA-312 | TP-316. |
| 16Cr-13Ni-3Mo | SA-376 | TP-316. |
| 18Cr-13Ni-4Mo | SA-312 | TP-317. |
| 18Cr-10Ni-Ti | SA-213 | TP-321. |
| 18Cr-10Ni-Cb | SA-213 | TP-347. |
| 18Cr-10Ni-Cb | SA-213 | TP-348. |
| 18Cr-10Ni-Ti | SA-312 | TP-321. |
| 18Cr-10Ni-Cb | SA-312 | TP-347. |
| 18Cr-10Ni-Cb | SA-312 | TP-348. |
| 18Cr-10Ni-Ti | SA-376 | TP-321. |
| 18Cr-10Ni-Cb | SA-376 | TP-347. |
| 18Cr-10Ni-Cb | SA-376 | TP-348. | can be employed in the construction of inlet line 8. Outlet line 10, being at even higher temperatures than inlet line 8, and quench line 24, when employed, can also be made of the above-defined stabilized high alloy austenitic steels. Outline line 10 can be a low alloy steel if it is refractory lined.

Tube 12 does not suffer from pressure limitations but is present at points of extremely high temperatures, and therefore can be made of stabilized high alloy austenitic steels such as the following:

| Nominal Composition | ASME Serial Designation | Type |
| --- | --- | --- |
| 19Cr-13Ni-3Mo | SA-240 | 317 |
| 18Cr-10Ni-2Mo | SA-167 | 316 |
| 18Cr-8Ni-Ti | SA-167 | 321 |
| 18Cr-8Ni-Cb | SA-167 | 347 |
| 18Cr-10Ni-Mo | SA-240 | 316 |
| 18Cr-10Ni-Ti | SA-240 | 321 |
| 18Cr-10Ni-Cb | SA-240 | 347 |
| 18Cr-10Ni-Cb-Ti | SA-240 | 348 | having a thickness of about 3/32 to about 1/2 inch. In the event inlet line 8 and outlet line 10 are positioned at the base of the reactor, baffle 12 is also positioned at the base of the reactor and could be constructed, if desired, of suitable refractory material.

In cases wherein the metal wall 4 is maintained at a temperature level not exceeding 700° F., it is preferred that carbon steels such as the following:

| Nominal Composition | ASME Serial Designation | Grade |
| --- | --- | --- |
| C—Si | SA-201 | A |
| C—Si | SA-201 | B |
| C—Si | SA-212 | A |
| C—Si | SA-212 | B |
| C—Mn—Si | SA-299 | | or low alloy steels such as the following:

| Nominal Composition | ASME Serial Designation | Grade |
| --- | --- | --- |
| C—1/2Mo | SA-204 | A |
| C—1/2Mo | SA-204 | B |
| C—1/2Mo | SA-204 | C |
| Mn—1/2Mo | SA-302 | A |
| Mn—1/2Mo | SA-302 | B |
| 5Cr—1/2Mo | SA-357 | |
| 1/2Cr—1/2Mo | SA-387 | A |
| 1Cr—1/2Mo | SA-387 | B |
| 1 1/4Cr—1/2Mo—Si | SA-387 | C |
| 2 1/4Cr—1Mo | SA-387 | D |
| 3Cr—1Mo | SA-387 | E | be employed having a wall thickness of about 1/2 to about four inches. In the event a temperature in excess of 700° F. but below 1000° F. can be tolerated in the metal wall 4, the same can be composed of the above stabilized high alloy austenitic steels. If desired, in order to combine the temperature, hydrogen and corrosion resistivity of the high-alloy steels with the economy of the low alloy or carbon steels, the metal wall can be made in two or more layers in intimate contact with each other, the outer wall being composed of an inexpensive metal such as the above carbon or low alloy steels and the inner wall of an alloy steel such as the above stabilized high alloy austenitic steels. In order to maintain the above temperature levels on the outer metal wall, a refractory lining composed largely of the oxides of silica, aluminum, magnesium, titanium, chromium, etc., similar to the refractories manufactured by Harbison-Walker, Pittsburgh, Pa., designated as "Insulating Fire Brick," "Fireclay," "Silica," "Alusite," "Fosterite," "Chrome," "Korundal," "Magnesite," etc. having a thickness of about one to about 12 inches can be employed. The refractory lining can be made of form-fitting refractory bricks made to fit the contours of the metal wall 4, with or without a similar mortar, or it can be sprayed, troweled or centrifugally cast onto the wall.

Under the conditions defined hereinabove, the residence time of the reactants within the reactor is about one to about 100 seconds. As the reaction product is removed from the reaction zone by line 10 it is at a temperature level of about 1300° to about 1700° F. and comprises principally dealkylated alkyl aromatic, unreacted charge aromatic, excess hydrogen and methane. In a matter of about one to about five seconds the reaction mixture is cooled by any convenient means, for example, by indirect heat exchange relationship with water, to a temperature below about 600° F. and after further cooling through heat exchanges to ambient temperature. Hydrogen and other gases are then vented from the reaction mixture and the remainder is separated into its component parts by any suitable means, preferably by distillation at a temperature of about 175° to about 250° F. and a pressure of about one to about 10 pounds per square inch gauge.

When quench line 24 is employed herein, charge alkyl aromatic, hydrogen or both can be introduced therethrough into the reactor in order to cool the reaction mixture in the event the temperature rise from inlet line 8 to outlet line 10 becomes excessive. In general the amount of quench introduced into the system is about 10 to about 30 percent by weight based on the total charge, but in no case is the temperature in the reaction stream at the point of addition reduced more than about 100° to about 300° F.

As illustrated herein, only one tube 12 is employed. It is apparent that many such tubes can be employed, each fitting within one another and attached to alternate ends of the reactor vessel 4, with the free ends of each tube being positioned in a fashion similar to the free end of tube 12. When an odd number of tubes is employed the outlet 10 will be at the end of reactor vessel 2 as shown in FIGURE 1. With an even number of tubes the outlet line 10 will be located at the opposite end of reactor vessel 2. In any event the use of a multiple number of tubes as described will tend to isolate the point of highest temperature level within the reactor vessel and provide additional insulating means for protection of the outer metal wall 4.

The invention can better be described by reference to Examples I and II below.

*Example I*

The reactor in this example is one similar to that illustrated in FIGURE 1 of the drawing having a total inner length of 9.75 feet and a total volume of 122.5 cubic feet. The inner diameter of the metal wall is 4.5 feet, the inner diameter of the refractory liner four feet and the inner diameter of the baffle 2.83 feet. The metal wall, having a total thickness of two inches, is made of two layers, a back-up plate 1.6 inches thick of SA–204–B low alloy steel and a steel liner 0.4 inch thick of 316 stainless steel. The refractory liner is three inches thick and is made of Harbison-Walker "Firebrick," which is composed of about 50 percent by weight $SiO_2$, about 45 percent by weight $Al_2O_3$, about 2.5 percent by weight of $TiO_2$ and about 2.5 percent by weight of other material. The baffle, which extends to within about nine inches of the refractory wall at the base of the reactor and is 3/16 inch thick, and the inlet line are both composed of 316 stainless steel.

The feed, which is introduced into the reactor at a temperature of 1100° F. and at a rate of 16,079.4 pounds per hour, is composed of about 82 percent by weight of toluene and about 5 percent by weight of hydrogen. The pressure in the reactor is maintained at 900 pounds per square inch gauge. By the time the reaction mixture has moved 4.9 feet from the entrance of the reactor into the annular space thereof, the temperature of the reaction mixture is raised to 1118° F. and 4.5 percent by weight of the toluene is converted to benzene. By the time the reaction mixture reaches the end of the annular path and begins to move upwardly into the core created by the baffle, the temperature of the reaction mixture is 1151° F. and the conversion is 11 percent. At points 4.19, 6.40, 7.55, 8.23, 8.68, 9.01, 9.32 and 9.75 feet above the base of the reactor and at the reactor outlet the respective temperatures are 1200°, 1250°, 1300°, 1350°, 1400°, 1450°, 1500° and 1543° F. The conversion at each of these temperature levels is, respectively, 21.5, 32.2, 43.0, 53.8, 64.6, 75.4, 86.3 and 95.5 percent by weight. The reaction effluent comprises, per hour, 593.4 pounds of toluene, 9722.9 pounds of benzene, 316.9 pounds of hydrogen and 5275.8 pounds of methane and other gases, and 170.4 pounds of diphenyl and other higher aromatics, is then cooled to a temperature of 600° F. in a matter of five seconds, and after venting the methane, hydrogen and other gases therefrom is subjected to distillation at a temperature of 180° F. and a pressure of one pound per square inch gauge at the top of the fractionator to recover the benzene.

*Example II*

The reactor in this example is one similar to FIGURE 1 of the drawing, but modified to include the quench means of FIGURE 2, having a total inner length of 28.5 feet and a total volume of 358 cubic feet. The inner diameter of the metal wall is 4.5 feet, the inner diameter of the refractory liner four feet and the inner diameter of the baffle 3.75 feet. The metal wall, having a total thickness of two inches, is made of two layers, a back-up plate 1.6 inches of SA–204–B low alloy steel and a steel liner 0.4 inch thick of 316 stainless steel. The refractory liner is three inches thick and is made of Harbison-Walker "Firebrick," which is composed of about 50 percent by weight $SiO_2$, about 45 percent by weight $Al_2O_3$, about 2.5 percent by weight of $TiO_2$ and about 2.5 percent by weight of other material. The baffle, which extends to within about two inches of the refractory wall at the base of the reactor is 3/16 inch thick, the inlet line and the quench line are all composed of 316 stainless steel.

The feed, which is introduced into the reactor at a temperature of 1116° F. and at a rate of 11,077.1 pounds per hour, is composed of about 82 percent by weight of toluene and about 5 percent by weight of hydrogen. The pressure in the reactor is maintained at 900 pounds per square inch gauge. By the time the reaction mixture has moved 14.25 feet from the entrance of the reactor and into the annular space thereof, the temperature of the reaction mixture is raised to 1140° F. and 4.3 percent by weight of the toluene is converted to benzene. By the time the reaction mixture reaches the end of the annular path and begins to move upwardly into the core created by the baffle, the temperature of the reaction mixture is 1190° F. and the conversion is 12.3 percent. As the reactants rise within the core both temperature and conversion increase rapidly so that at a point two feet from the reactor base the temperature is 1350° F. and conversion is 38.3 percent. To prevent excessive temperatures cold feed or quench at a temperature of 500° F. and at the rate of 5002.3 pounds per hour consisting of about 82 percent by weight of toluene and about five percent by weight of hydrogen, is introduced into the reactor by the quench line at a distance of two feet above the refractory floor. Temperature of the reactants immediately after quench is 1116° F. At points 9.8, 16.8, 20.9, 23.3 and 26.0 feet above the base of the reactor and at the reactor outlet, the respective temperatures are 1150°, 1200°, 1250°, 1300°, 1325° and 1350° F. The conversion at each of these temperature levels is, respectively, 43.0, 59.0, 71.0, 83.2, 90.8 and 95.5 percent. The reactor effluent comprises, per hour, 593.4 pounds of toluene, 9722.9 pounds of benzene, 316.9 pounds of hydrogen and 5275.8 pounds of methane and other gases and 170.4 pounds of diphenyl and other higher aromatics, is then cooled to a temperature of 600° F. in a matter of five seconds, and after venting the methane, hydrogen and other gases therefrom, is subjected to distillation at a temperature of 180° F. and a pressure of one pound per square inch gauge at the top of the fractionator to recover the benzene.

Obviously many modifications and variations of the invention, as hereinabove set forth, can be made without departing from the spirit and scope thereof, and therefore only such limitations should be imposed as are indicated in the appended claim.

We claim:

A process for the hydrodealkylation of an alkyl aromatic which comprises heating said alkyl aromatic and hydrogen to a temperature of about 1000° to about 1100° F., introducing a mixture of said heated alkyl aromatic and said hydrogen into a longitudinal annular path, permitting hydrodealkylation of said alkyl aromatic to occur while said mixture is moving in said path, the reaction heat produced by said hydrodealkylation reaction being sufficient to progressively increase the temperature of said reaction mixture and the rate of said hydrodealkylation reaction, reversing the path of flow of said reaction mixture within the core created by said longitudinal annular path but out of contact with said reaction mixture in said longitudinal annular path, thereby further increasing the temperature of the reaction mixture to a temperature of about 1300° to about 1700° F., and thereafter recovering dealkylated alkyl aromatic from the reaction product obtained.

References Cited in the file of this patent

UNITED STATES PATENTS

| | | |
|---|---|---|
| 1,935,067 | Vobach et al. | Nov. 14, 1933 |
| 2,340,930 | Campbell et al. | Feb. 8, 1944 |
| 2,768,219 | Hoffmann | Oct. 23, 1956 |
| 2,907,800 | Mertes | Oct. 6, 1959 |